Sept. 9, 1930.   G. T. RONK   1,775,295
MACHINE PART
Filed April 24, 1928
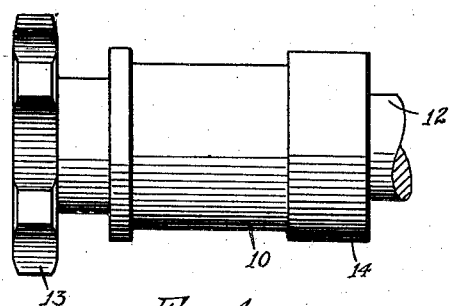
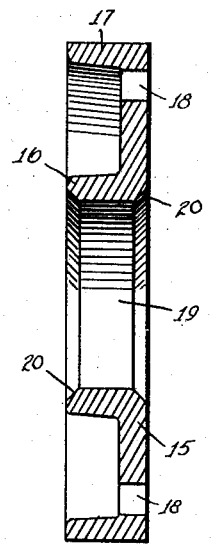
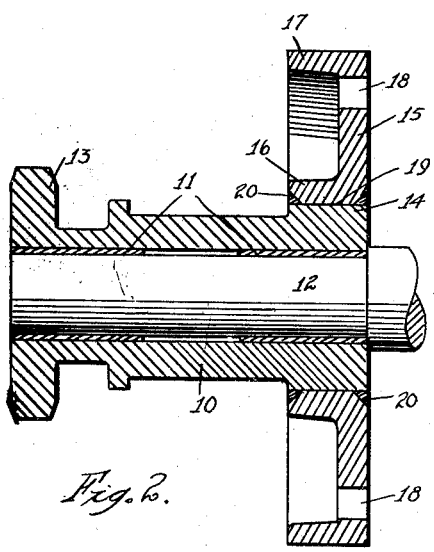
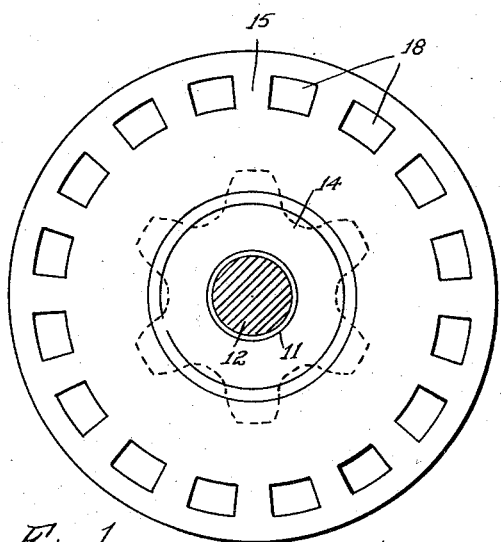

Patented Sept. 9, 1930

1,775,295

UNITED STATES PATENT OFFICE

GEORGE T. RONK, OF CEDAR RAPIDS, IOWA

MACHINE PART

Application filed April 24, 1928. Serial No. 272,476.

This invention relates to machine parts such for instance as a hub having a sprocket at one end and a large gear at its opposite end, and the method of constructing and finishing same.

The difficulty in manufacturing this type of machine parts, which are unusually large and heavy, is great, due to the fact that it is hard to form the castings without excessive shrinkage and warping; and furthermore, great difficulty is experienced in boring the hub or sleeve and finishing the gears.

The object of my invention is to provide an improved machine element which comprises a combined clutch member, brake band drum and sprocket wheel supported on a sleeve or hub, such as disclosed in my co-pending application, Serial Number 257,772, filed February 28, 1928 on steering mechanism for tractors, and designated by the numerals 15, 16 and 16ª in said application.

A further object is to provide a new method of manufacturing this type of machine parts, whereby the cost of manufacture may be greatly decreased, and the efficiency and accuracy of the part after manufacture increased.

My invention consists in the construction, arrangement and combination of the various machine parts, whereby the objects contemplated are attained, as hereinafter more fully set forth, pointed out in my claim, and illustrated in the accompanying drawings, in which:

Figure 1 is an end elevation of a combined brake drum and clutch member, having a hub and a sprocket wheel on the opposite end of the hub.

Figure 2 is a longitudinal sectional view of same.

Figure 3 is a detail sectional view of the clutch member; and

Figure 4 is a side elevation of the hub and sprocket wheel.

In the drawings, I have used the reference numeral 10 to indicate a hub or sleeve, which is bored and provided with bushings 11 rotatively mounted on the shaft 12. One end of the hub 11 is provided with a sprocket wheel 13 cast integral with said hub. The opposite end of the hub 11 is provided with an enlarged cylindrical portion 14, which is machine finished, said finished surface being designed to support a clutch member 15 which is in the form of a disk having a hub or flange portion 16 and a flange 17. Said flange 17 is turned to form a drum for receiving a brake band.

The disk 15 has a series of openings 18 for receiving jaw members of a coacting clutch member, which may also be mounted on the shaft 12.

The flange portion 16 is provided with a machined opening 19, enlarged at each end. The portion 14 is of such diameter that it may be inserted in the opening 19 under pressure, so that the parts may be united under what is commonly known as a press fit.

The enlarged portions of the opening 19 provide annular grooves 20 above the portion 14. These grooves are filled with molten metal, which is applied by the electric welding process, thereby uniting or welding the flange 16 to each end of the portion 14 of the hub 10.

Thus it will be seen that I have provided a machine part comprising a hub, a sprocket wheel cast integral therewith, and a clutch and drum portion, which is fixed rigidly to said hub portion by the welding process, in addition to the press fit between the hub and flange portion.

Great advantage is gained by this method of forming a machine part, which may also be applied to other similarly constructed parts. It will readily be seen that the hub portion and the sprocket 13, which is smaller in diameter than the drum and clutch member, may be mounted in a suitable lathe, such as provided in ordinary machine shops. The boring of the sleeve and the finishing of one end of the hub is easily and quickly accomplished, while the clutch member and drum portion may be mounted in a separate machine adapted for operating on flat disk-like machine elements, such as spur gears, the said part being too large to be turned in the ordinary turning lathe.

After the individual parts are properly machined and shaped, then they may be easily and quickly placed together and rigidly secured by the electric welding process as above described, which I have found by actual experience greatly cheapens the construction of the casting, as well as increases the accuracy of the machine parts.

It will readily be seen that the hub may be very accurately turned in the ordinary lathe, with the machined surface of the portion 14 concentric with the hub opening or bushings 11. In the same manner the opening 19 of the clutch member is formed perpendicular to the clutch surface and also concentric with the drum surface, thereby providing a machine part whereby the clutch surface will be perpendicular to the shaft on which the machine part is rotatively mounted, and the drum surface will be absolutely concentric with the shaft.

In the particular machine part illustrated, the sprocket 13 may be advantageously made integral with the hub, inasmuch as the said sprocket is comparatively small in diameter; and further in view of the fact that absolute accuracy in the shape of the sprocket wheel is not necessary. It will readily be seen that in case of a large sprocket, both ends of the hub 13 may be machined and finished and the sprocket provided with a machined opening, having an enlarged portion at each end to form annular grooves, such as provided for the clutch member, and the sprocket welded in position in the same manner as the clutch member.

Thus it will be seen that I have provided an improved method of forming machine parts, which consists in building the part of a number of elements, each of which may be formed and machined separately, and united by providing in one of the elements a machined opening and in the other a machined surface to fit said opening under pressure, and providing in connection therewith an annular groove for receiving molten metal for welding the said elements together.

I claim as my invention:

A machine part comprising a hollow body member having a sprocket at one end and a cylindrical machined surface at the other end, a cylindrical clutch member having a machined opening for receiving the finished end of said body member, the opening being beveled at each end to form annular grooves between the machined surface of the body and said clutch member, said grooves being filled with moulten metal applied by the electric welding process to unite said clutch member and body.

Des Moines, Iowa, April 11, 1928.

GEORGE T. RONK.